US009832569B1

(12) United States Patent
Ayrapetian et al.

(10) Patent No.: US 9,832,569 B1
(45) Date of Patent: Nov. 28, 2017

(54) MULTICHANNEL ACOUSTIC ECHO CANCELLATION WITH UNIQUE INDIVIDUAL CHANNEL ESTIMATIONS

(71) Applicant: Amazon Technologies, Inc., Seattle, WA (US)

(72) Inventors: Robert Ayrapetian, Morgan Hill, CA (US); Michael Alan Pogue, Sunnyvale, CA (US); Kenneth Edgar Hild, II, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/369,198

(22) Filed: Dec. 5, 2016

Related U.S. Application Data

(63) Continuation of application No. 14/750,540, filed on Jun. 25, 2015, now Pat. No. 9,554,210.

(51) Int. Cl.
*H04B 3/20* (2006.01)
*H04R 3/00* (2006.01)

(52) U.S. Cl.
CPC .................. *H04R 3/002* (2013.01)

(58) Field of Classification Search
CPC ............. H04R 3/002; H04B 3/20; H04B 3/23
See application file for complete search history.

(56) References Cited

U.S. PATENT DOCUMENTS

| 6,556,682 | B1 * | 4/2003 | Gilloire ................ | H04M 9/082 379/406.01 |
| 6,570,985 | B1 * | 5/2003 | Romesburg .............. | H04B 3/23 379/390.02 |
| 2003/0202654 | A1 * | 10/2003 | Xiong .................... | H04M 9/082 379/406.01 |
| 2004/0174991 | A1 * | 9/2004 | Hirai ........................ | H04R 3/02 379/406.08 |
| 2005/0220292 | A1 * | 10/2005 | Okumura .............. | H04M 9/082 379/406.12 |

* cited by examiner

*Primary Examiner* — Simon King
(74) *Attorney, Agent, or Firm* — Pierce Atwood LLP

(57) ABSTRACT

A multi-channel echo cancellation system that dynamically adapts to changes in acoustic conditions. The system does not require a sequence of "start-up" tones to determine the impulse responses. Rather, the adaptive filters approximate estimated transfer functions for each channel. A secondary adaptive filter adjusts cancellation to adapt to changes in the actual transfer functions over time after the adaptive filters have been trained, even if the reference signals are not unique relative to each other.

20 Claims, 6 Drawing Sheets

MULTICHANNEL ACOUSTIC ECHO CANCELLATION WITH UNIQUE INDIVIDUAL CHANNEL ESTIMATIONS

CROSS-REFERENCE TO RELATED APPLICATION

This application is a continuation of, and claims the benefit of priority of, U.S. Non-provisional patent application Ser. No. 14/750,540, filed Jun. 25, 2015 and entitled "MULTICHANNEL ACOUSTIC ECHO CANCELLATION WITH UNIQUE INDIVIDUAL CHANNEL ESTIMATIONS," the contents of which is expressly incorporated herein by reference in its entirety.

BACKGROUND

In audio systems, acoustic echo cancellation (AEC) refers to techniques that are used to recognize when a system has recaptured sound via a microphone after some delay that the system previously output via a speaker. Systems that provide AEC subtract a delayed and filtered version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" of the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

To simplify explanation of these figures, the same reference numbers and notation will be used to identify and discuss both an adaptive filter and that filter's estimated transfer function.

DETAILED DESCRIPTION

When sounds are output by multiple speakers in a room, and those sounds are captured by one-or-more microphones, how much sound from each speaker will reach each microphone can be characterized by a "transfer" function $h(k)$, where "k" is a digital sample of an audio signal. In principle, if the transfer function for each speaker-to-microphone coupling is known, then by adjusting for the time delay between sound being output by the speakers and being captured by the microphone(s), and filtering the time-delayed sound to reproduce the transfer functions, the sound output by each speaker can be subtracted from captured ambient sounds.

Acoustic echo cancellation (AEC) systems utilize adaptive filters to determine estimated transfer functions $\hat{h}(k)$ for each speaker-to-microphone coupling, mathematically modelling the acoustic "impulse response" of the room relative to the individual components (e.g., speakers, microphones). The impulse response of the room can be used to predictively characterize the signals that will be captured by a microphone when presented with a brief input signal (e.g., an audible noise), called an impulse. The impulse response describes the reaction of the system as a function of time, and the (theoretical) impulse has its own frequency response. In addition, the actual transfer functions $h(k)$ can change dynamically, such as when movement of something in the room (e.g., a person) subtly alters room acoustics. As a result, it is necessary to continually update the estimated transfer functions $\hat{h}(k)$ to maintain good echo cancellation.

A fundamental problem of AEC in stereo and multichannel systems when updating the estimated transfer functions $\hat{h}(k)$ is a "non-uniqueness" problem. When signals sent to the speakers are perfectly correlated (e.g., playing back a monaural sound recording through a stereo), there can be more than one solution to the adaptive filter equation that is used to estimate the transfer functions between output speakers and input microphones (e.g., estimated transfer functions $\hat{h}_1(k)$ and $\hat{h}_2(k)$). Accurate estimated transfer functions are essential for obtaining good echo cancellation, so obtaining a good result in this correlated condition is challenging. In this case, it is impossible to recover $h_1$ and $h_2$.

Figure 1:
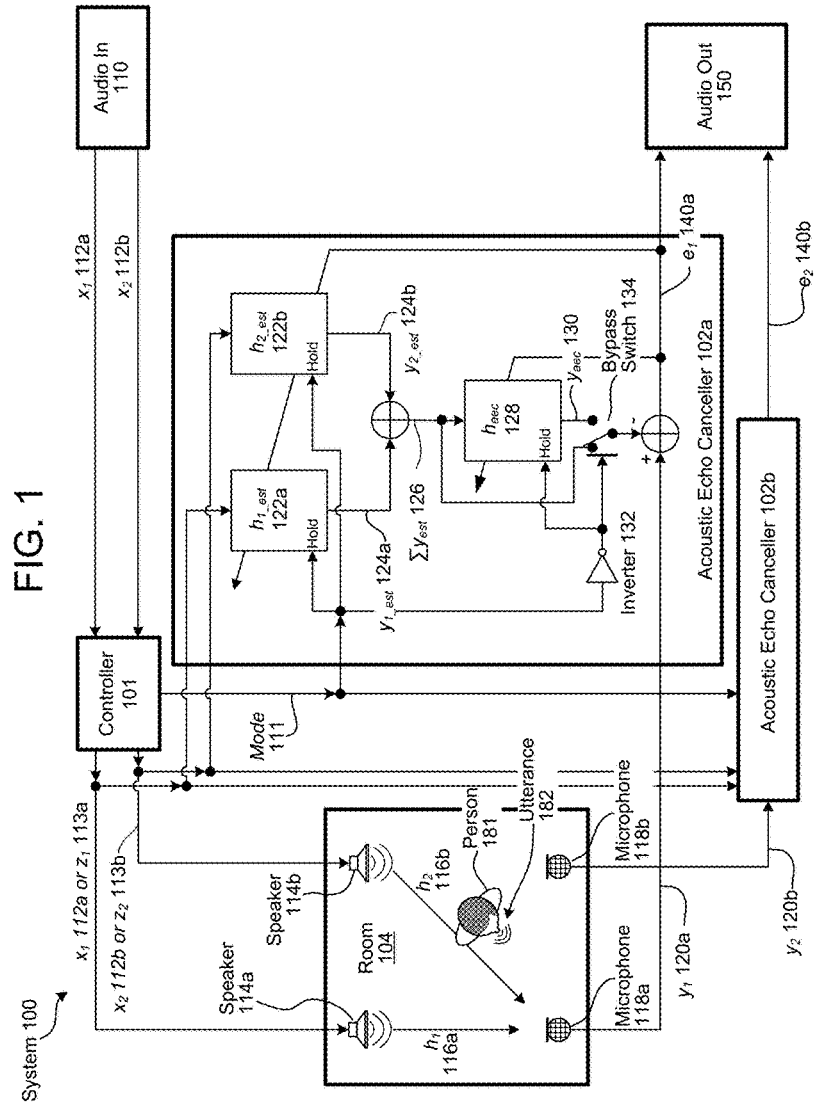
FIG. 1 illustrates a multi-channel echo cancellation system that dynamically adapts to changes in acoustic conditions.

FIG. 1 illustrates a multi-channel echo cancellation system 100 that includes acoustic echo cancellers 102 that dynamically adapt to changes in acoustic conditions. The system 100 does not require a sequence of "start-up" tones to determine the impulse response of the room 104. Rather, the adaptive filters 122 determine estimated transfer functions $\hat{h}_m(k)$ for each channel even if the initial reference audio signals $x_m(k)$ 112 are highly correlated (e.g., perfectly correlated non-unique monaural signals). A secondary adaptive filter $h_{aec}$ 128 adjusts cancellation to adapt to changes in the actual transfer functions $h_m(k)$ 116 over time after the adaptive filters 122 have been trained, even if the reference signals are not perfectly uncorrelated relative to each other.

Figure 6:
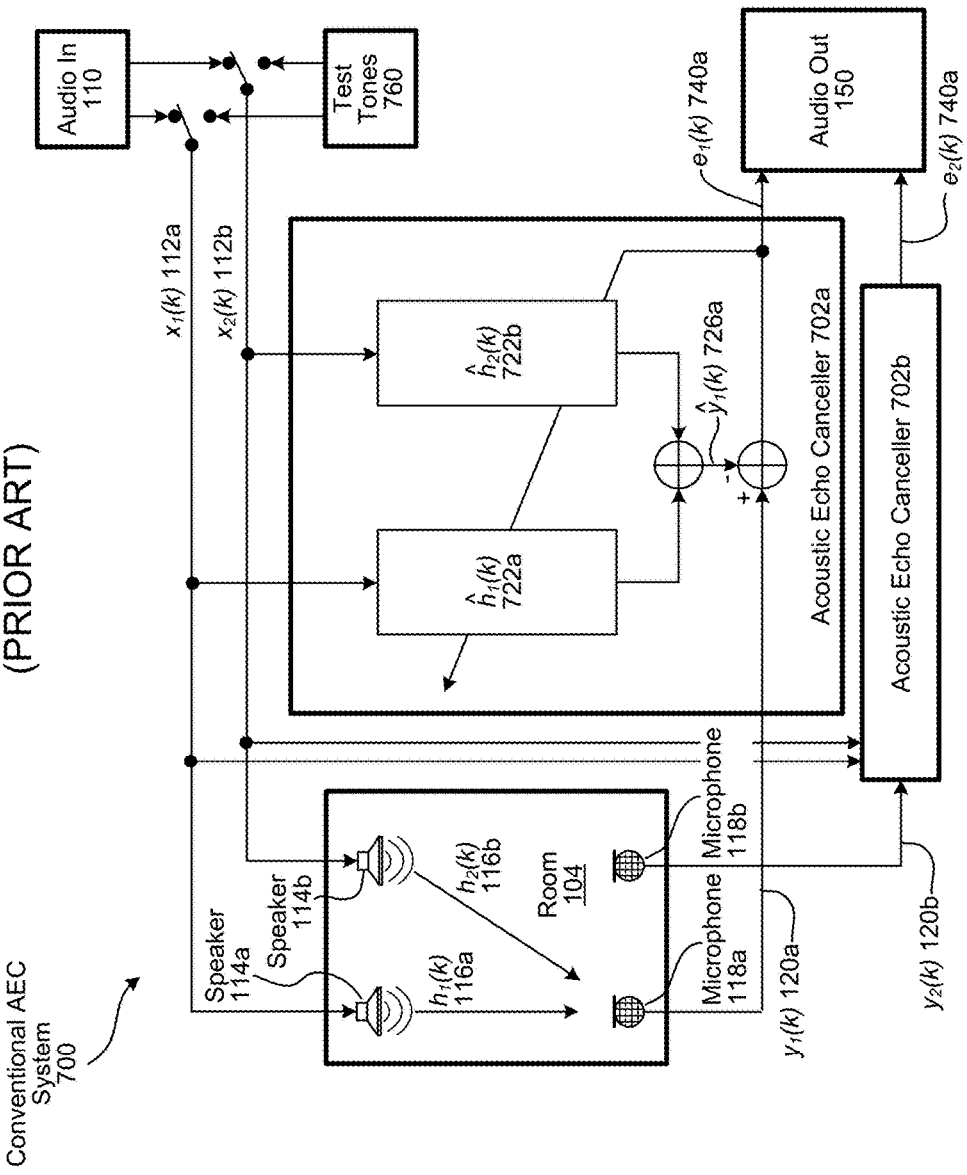
FIG. 6 illustrates an example of a prior art echo cancellation system.

To better explain the operation of the improved system, a conventional multi-channel AEC system 700 will be discussed in connection with FIG. 6. The conventional AEC system 700 derives adaptive filter coefficients using techniques such as least mean squares (LMS) or other stochastic gradient algorithms. Such algorithms use an instantaneous estimate of a gradient to update an adaptive weight vector at each time or sample step "k". The "echo" signal $y_1(k)$ 120a from the microphone 118a contains some of the reproduced sounds from the reference signals $x_1(k)$ 112a and $x_2(k)$ 112b (i.e., the "echo"), in addition to any sounds picked up in the room 104. The reference signals $x_1(k)$ 112a and $x_2(k)$ 112b are sent to and output by the speakers 116a/116b. For example, the reference signals might be music.

The reference signals $x_1(k)$ 112a and $x_2(k)$ 112b are also provided to the adaptive filters 722a and 722b of the AEC 702a so that the AEC can remove the contribution of the reference signals from the echo signal(s) (e.g., 120a, 120b). Focusing on the "left" microphone for the purpose of explanation, if there is no utterance 182 or other ambient noise in the room 104, the echo signal $y_1(k)$ 120a (the portion of the microphone signal due to the reference signals) can be expressed as:

$$y_1(k)=h_1(k)*x_1(k)+h_2(k)*x_2(k) \quad [1]$$

where $h_1(k)$ 116a and $h_2(k)$ 116b are the loudspeaker-to-microphone impulse responses in the receiving room 104, $x_1(k)$ 112a and $x_2(k)$ 112b are the loudspeaker reference signals, * denotes a mathematical convolution, and "k" is an audio sample.

The adaptive filters 722a/722b of the acoustic echo canceller 702a may use a series of test tones from a test tone generator 760 to calculate the estimated transfer functions $\hat{h}_1(k)$ 722a and $\hat{h}_2(k)$ 722b that approximate the actual transfer functions $h_1(k)$ 116a and $h_2(k)$ 116b when the system 700 first starts up. The system 700 may further adjust the estimated transfer functions during regular device operations, but as noted above, if the reference signals $x_1(k)$ 712a and $x_2(k)$ 712b are correlated, the accuracy of echo cancellation will degrade.

These estimates are combined with the reference signals $x_1(k)$ 712a and $x_2(k)$ 712b, and then each other, to produce an estimated echo signal $\hat{y}_1(k)$ 726a, corresponding to an estimate of the echo component in the microphone-captured echo signal $y_1(k)$ 120a. The estimated echo signal $\hat{y}_1(k)$ 724a can be expressed as:

$$\hat{y}_1(k)=\hat{h}_1(k)*x_1(k)+\hat{h}_2(k)*x_2(k) \quad [2]$$

where * again denotes convolution.

Subtracting the estimated echo signal $\hat{y}_1(k)$ 726a from the echo signal 120a produces an "error" signal $e_1(k)$, which serves as the audio output 150. Specifically:

$$e_1(k)=y_1(k)-\hat{y}_1(k) \quad [3]$$

The "error" signal $e_1(k)$ 740a is so-named because if it is not equal to zero when there are no ambient noise sources in the room 104 (in other words, all captured sounds emanated from the speakers 114a and 114b), then the value is the result of an error in one or more of the estimated transfer functions $\hat{h}(k)$ (i.e., 722a, 722b, or both), assuming non-linearities and/or time-variation.

The estimated transfer functions $\hat{h}_1(k)$ 722a and $\hat{h}_2(k)$ 722b are calculated using adaptive filter coefficients. With this notation, an LMS algorithm can be iteratively expressed in the form:

$$\hat{h}_{new}=\hat{h}_{old}+\mu*e*x \quad [4]$$

where $\hat{h}_{new}$ is an updated estimated transfer function, $\hat{h}_{old}$ is an estimated transfer function from a prior iteration, $\mu$ is the step size between samples, e is an error signal, and x is a reference signal.

Applying such adaptation over time (i.e., over a series of samples), it follows that the error signal $e_1(k)$ 740a should approximately "converge" to a point where the mean square error is minimum for a suitable choice of the step size $\mu$. This assumes that the sounds captured by the microphone 118a corresponds to sound entirely based on the references signals 712a and 712b rather than additional ambient noises, such that the estimated echo signal $\hat{y}_1(k)$ 726a cancels out the echo signal $y_1(k)$ 120a. However, e→0 does not always imply that h−ĥ→0, where the estimated transfer function ĥ cancelling the corresponding actual transfer function h is the goal of the adaptive filter. For example, the estimated transfer functions $\hat{h}_1(k)$ 722a and $\hat{h}_2(k)$ 722b may cancel a particular string of samples, but may unable to cancel all signals, e.g., if the string of samples has no energy at one or more frequencies. As a result, accurate echo cancellation may be intermittent or transitory. Requiring that ĥ→h is the goal of single-channel echo cancellation, and becomes even more critical in the case of multichannel echo cancellers that require estimation of multiple transfer functions.

Returning to FIG. 1, the AEC system 100 includes improved automatic echo cancellers 102a and 102b. A feature that distinguishes stereo echo cancelers 102a/102b from conventional single-channel cancelers 702a/702b can be explained even without considering the control aspects of the adaptation algorithm. Setting aside the important question of how convergence is achieved, assume that the error signal $e_1(k)$ 126a has been driven to be exactly zero. From Equation [3], it follows that $$(h_1(k)-\hat{h}_1(k))*x_1(k)+(h_2(k)-\hat{h}_2(k))*x_2(k)=0 \quad [5]$$

Converting from the time domain in Equation [5] to the frequency domain, this becomes:

$$(H_1(f)-H_{1\_est}(f))*X_1(f)+(H_2(f)-H_{2\_est}(f))*X_2(f)=0 \quad [6]$$

where the frequency-domain Fourier transforms of the time-domain functions in Equation [5] are denoted by corresponding uppercase letters in Equation [6]. However, Equation [6] does not necessarily mean $H_1=H_{1\_est}$ and $H_2=H_{2\_est}$, which is the condition required for complete alignment. As used herein, notation with the carat accent symbol "^" and subscript "est" both denote that the function or value is an estimate, and these two notations are used interchangeably.

A problem with stereo echo cancelers is that to maintain accuracy over time, the adaptive filters' adaptation algorithm must adjust the filter coefficients that provide the estimated transfer functions $h_{1\_est}$ 122a and $h_{2\_est}$ 122b to track variations in the receiving room 104 due to environmental factors such as the movement of a person 181 altering the acoustic impulse response of the room. However, as is apparent from Equation [6], even if the actual impulse responses $h_1(k)$ 116a and $h_2(k)$ 116b in the receiving room 104 are static, changes in coherence between $x_1(k)$ and $x_2(k)$ may result in incorrect adjustment/adaptation of $H_{1\_est}(f)$ and $H_{2\_est}(f)$, except in the unlikely condition where $H=H_{est}$. Thus, not only must the adaptation algorithm make adjustments to filter coefficients to track variations in the acoustic impulse responses in the receiving room 104, such as adaptations to adjust for variations in the actual transfer functions $h_m$ 116 due to movement of a person 181, but the adaptation algorithm must also track variations in in the coherence of the reference signals $x_m(k)$ 112.

This latter variation is particularly difficult to track. Consider the case the reference signals from the audio input 110 are from a recording studio where one talker in the studio stops talking and another person starts talking, but from a different physical location within the recording studio. In this case, the coherence of the reference signals $x_m(k)$ 112 may change abruptly and by very large amounts. The challenge then, is to devise an algorithm which (as in the case of a single-channel canceler) converges independently of variations in coherence of the reference signals $x_m(k)$ 112.

Coherence, which is also known as "spectral coherence" or "magnitude-squared coherence," is a statistic used in signal processing to characterize the relationship between signals or data sets. For example, between two time-domain signals a(t) and b(t), a real-valued coherence function may be defined as:

$$C_{ab}(f) = \frac{|S_{ab}(f)|^2}{S_{aa}(f)S_{bb}(f)} \quad [7]$$

where $S_{ab}(f)$ is the cross-spectral density between a and b, and $S_{aa}(f)$ and $S_{bb}(f)$ are the frequency domain auto-spectral density of a and b respectively. The magnitude of the spectral density is denoted as |S|. The coherence function estimates the extent to which b(t) may be predicted from a(t) by an optimum least squares function, with the values of coherence satisfying $0 \le C_{ab}(f) \le 1$. If the signals a(t) and b(t) are perfectly or fully correlated, the coherence function will be equal to one (e.g., if the signals a(t) and b(t) are identical). If the signals are fully decorrelated, the coherence function will be equal to zero.

If the input source 110 provides reference signals $x_m(k)$ 112 that are perfectly uncorrelated and the loudspeakers 116 that playback the reference signals $x_m(k)$ 112 are spatially-separated (that is, referring to Equation [7], C(f)=0), then the non-uniqueness problem essentially disappears. As a result, $H = H_{\_est}$ (at convergence). In comparison, errors ordinarily occur when estimating transfer functions in stereo/multi-channel echo cancellation systems when the reference signals $x_1(k)$ 112a and $x_2(k)$ 112b are correlated. These errors may not be instantaneously apparent, but as noted above, as the signals-to-be-cancelled change over time, the inaccurate estimated transfer functions may produce errors as the signals $x_1(k)$ 112a and $x_2(k)$ 112b diverge.

If the reference signals $x_1(k)$ 112a and $x_2(k)$ 112b are insufficiently decorrelated to address the non-uniqueness problem, they may be selectively decorrelated. For example, if an average of $C_{x_1 x_2}(f) < 0.5$ (f=20 Hz to 20 kHz), the reference signals may be determined to be sufficiently decorrelated for adapting the filters $h_{m\_est}(k)$ 122, and if the average of $C_{x_1 x_2}(f) \ge 0.5$, the reference signals may be determined to be insufficiently decorrelated for adapting the filters $h_{m\_est}(k)$ 122. There are several well-known methods that may be used to reduce the correlation between channels. One of them is Benesty non-linear distortion added for both channels:

$$z_1 = x_1 + 0.15*(x_1 + |x_1|) \rightarrow \text{if } x_1 <= 0, z_1 = x_1 \text{ else } z_1 = x_1 + 0.3*x_1 \quad [8]$$

$$z_2 = x_2 + 0.15*(x_2 - |x_2|) \rightarrow \text{if } x_2 >= 0, z_2 = x_2 \text{ else } z_2 = x_2 + 0.3*x_2 \quad [9]$$

where $z_1$ (113a) and $z_2$ (113b) correspond to the decorrelated versions of the reference signals $x_1$ (112a) and $x_2$ (112b). Another method to generate decorrelated reference signals $z_1$ (113a) and $z_2$ (113b) from the reference signals $x_1$(112a) and $x_2$(112b) is to use time-varying all-pass filters. There are other methods as well, such as adding a variable sample delay that is different for each channel, and adding uncorrelated noise.

Consider a system that consists of M loudspeakers with reference signals $x_1(k), x_2(k), \ldots x_M(k)$. For simplicity, in FIG. 1, M=2. For each loudspeaker m (m=1, 2, . . . , M), there is a dedicated adaptive filter $\hat{h}_m(k)$ 122 (illustrated as $h_{m\_est}(k)$ 122). Input into each adaptive filter $h_{m\_est}(k)$ 122 is either a reference signal $x_m(k)$ 112 or a decorrelated reference signal $z_m(k)$ 113, which corresponds to audio reproduced from loudspeaker m 114.

The output of each adaptive filter $h_{m\_est}$ 122 is a signal $y_{m\_est}(k)$ 124:

$$Y_{m\_est}(k) = h_{m\_est}(k) * x_m(k) \quad [10]$$

The sum of outputs of the adaptive filters $y_{m\_est}$ (m=1, 2, . . . , M) is $\Sigma y_{est}(k)$ 126:

$$\Sigma y_{est}(k) = y_{1\_est}(k) + y_{2\_est}(k) + \ldots + y_{M\_est}(k) \quad [11]$$

Figure 5:
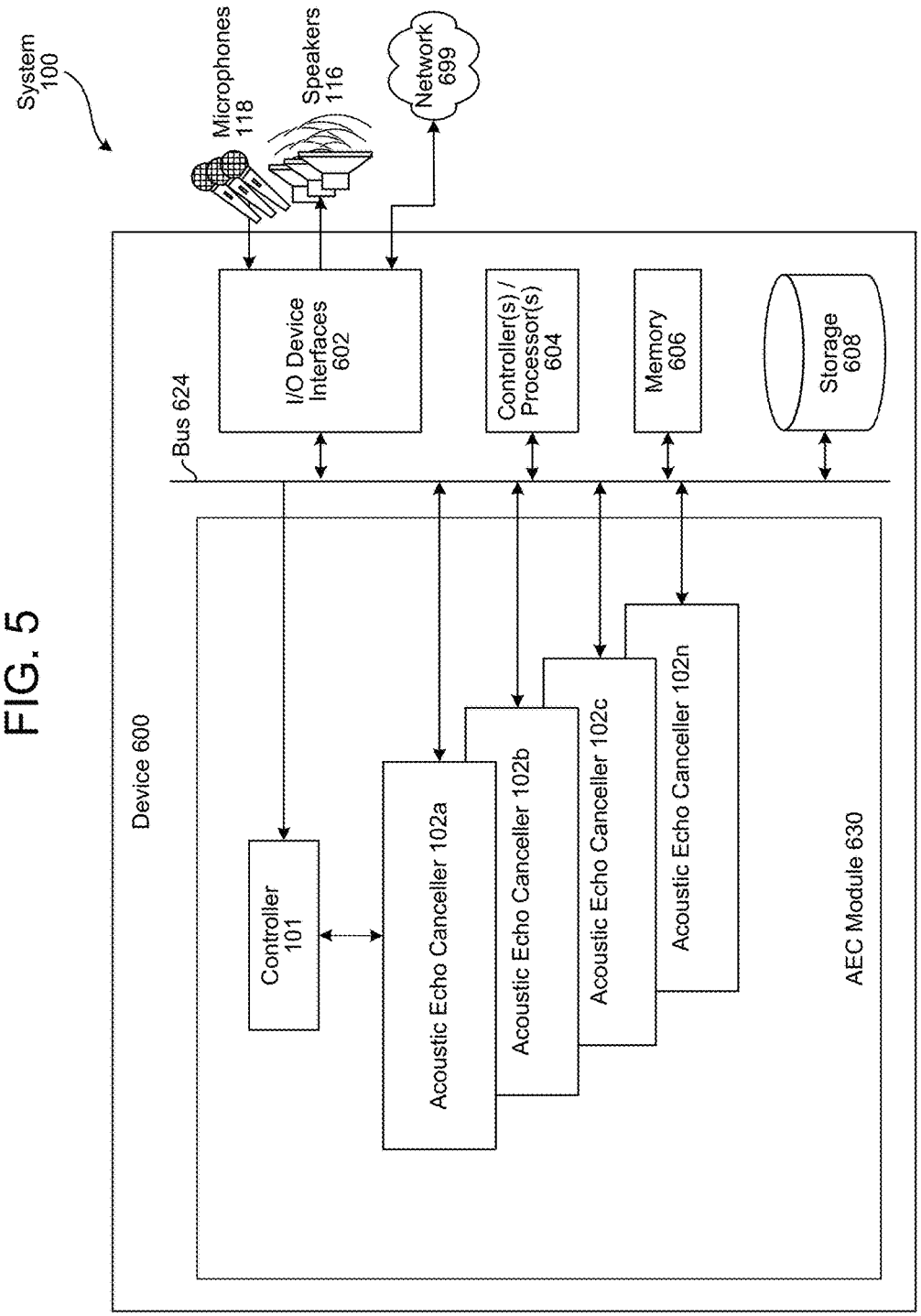
FIG. 5 is a block diagram conceptually illustrating example components of a system for echo cancellation.

In a conventional design such as that discussed in FIG. 5, the combined signal $\Sigma y_{est}(k)$ 126 would be subtracted from an echo signal y(k), resulting in an error signal e(k). Instead, as illustrated in FIG. 1, the combined signal $\Sigma y_{est}(k)$ 126 is instead input into a secondary adaptive filter $h_{aec}$ 128. While the filter coefficients of the adaptive filters 122a and 122b are adapted to converge, the secondary adaptive filter $h_{aec}$ 128 is bypassed, as will be explained in connection with FIG. 2, and the value $\Sigma y_{est}(k)$ 126 is subtracted from the echo signal $y_1(k)$ 120a to produce the echo signal $e_1(k)$ 140a. However, once the adaptive filters 122a and 122b have converged, their filter coefficients are locked while the filter coefficients of the secondary adaptive filter 128 adapt to adjust for changing ambient conditions in the receiving room 104.

Figure 2:
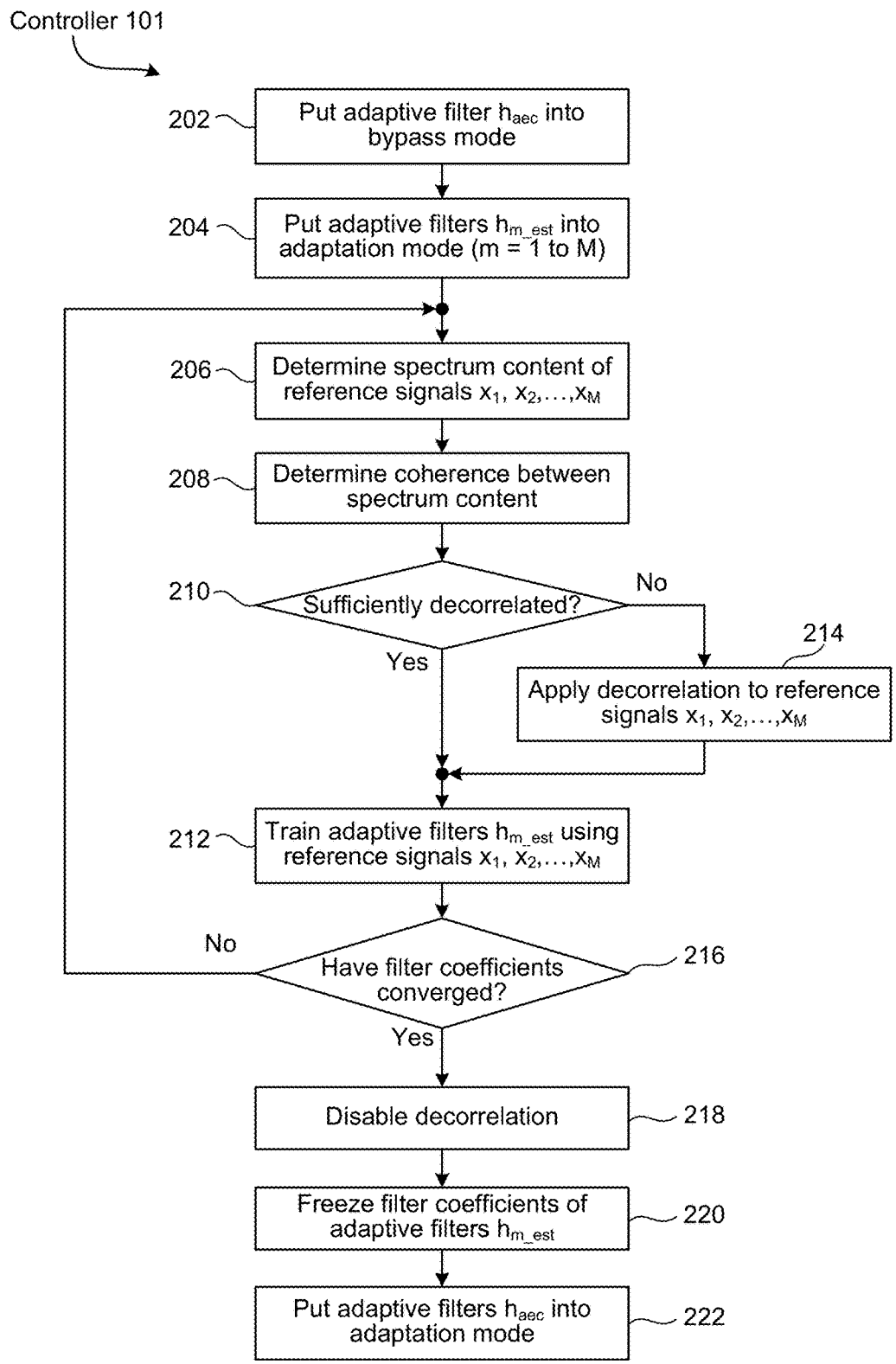
FIG. 2 illustrates an example of a controller-executed process of the system in FIG. 1.

A controller 101 controls (among other things) whether the secondary adaptive filter $h_{aec}$ 128 is active or bypassed, and whether decorrelation is applied to the reference signals 112. An example of the process executed by the controller is illustrated in FIG. 2. The filter coefficients of the adaptive filters $h_{m\_est}$ 122 and $h_{aec}$ 128 may be initialized to default values (e.g., zeros) when the system starts up, although this is not essential since the filters will rapidly converge toward new coefficients during operation without regard to the initial values.

Initially, the controller 101 places (202) the secondary adaptive filter $h_{aec}$ 128 into a bypass mode. As illustrated in FIG. 1, an example of how this may be performed is by changing the mode signal 111 to "false" (i.e., logic zero). An inverter 132 inverts the mode signal 111 and applied it to a "hold" input of the secondary adaptive filter $h_{aec}$ 128, freezing its filter coefficients. The inverted signal is also applied to a bypass switch 134, which directs the signal $\Sigma y_{est}(k)$ 126 around the secondary adaptive filter $h_{aec}$ 128. While in bypass mode, $\Sigma y_{est}(k)$ 126 is subtracted from the echo signal $y_1(k)$ to obtain the error signal $e_1(k)$ 140a.

The controller 101 also places (204) the adaptive filters $h_{m\_est}$ 122 for each of the M channels (m=1, 2, . . . , M) into an adaptation mode. As illustrated in FIG. 1, this may be accomplished by applying the mode signal 111 in the "false" state to the "hold" input of each adaptive filters $h_{m\_est}$ 122, such that each filter is free-running and continually adapt and refine their filter coefficients to minimize a function of the absolute value of the error signal $e_1(k)$ 140a over time.

The controller 101 determines (206) audio spectral content of the reference signals $x_1, x_2, \ldots, x_M$, converting each signal from time domain to frequency domain (i.e., $X_1, X_2, \ldots, X_M$) by performing a Fourier transform on each reference signal. The controller 206 may perform this conversion using any technique, such as performing Fourier transforms using a Digital Signal Processor (DSP), or using a fast Fourier transform (FFT) processor.

The controller 101 takes the spectral content information (i.e., $X_1, X_2, \ldots, X_M$) and measures (208) the coherence (correlation level) between them. Any spectral correlation/coherence comparison technique may be used, such as the magnitude-squared coherence function determined based on cross-spectral density functions, as discussed above in connection with Equation [7].

The results of the correlation/coherence function (such as that in Equation [7]) is usually frequency dependent, such that the reference signals $x_m$ 112 may have different coherence values at different frequencies. The controller 101 may determine a degree of coherence value based on the coherence function, and compare that coherence value with a correlation threshold value. For example, the controller 101 may take an average of the coherence values C(f) across the audible spectrum (i.e., 20 Hz to 20 kHz), an average across a defined range of the audible spectrum (e.g., 200 Hz to 8

KHz), or an average of a plurality of predefined frequencies. As the directionality of higher frequencies is greater than that of lower frequencies, a weighted average may be used, giving the coherence function results of higher frequencies more weight than the coherence function results of lower frequencies. In the alternative, the controller 101 may determine the degree of coherence value based on a statistic of the coherence function across a range of the audible spectrum, such as selecting the maximum result as the degree of coherence value. For instance, if a minimum of C(f) is zero at 20 Hz (fully decorrelated) and a maximum of C(f) is one at 5 kHz (perfectly correlated), the correlation value would be one.

Figure 3:
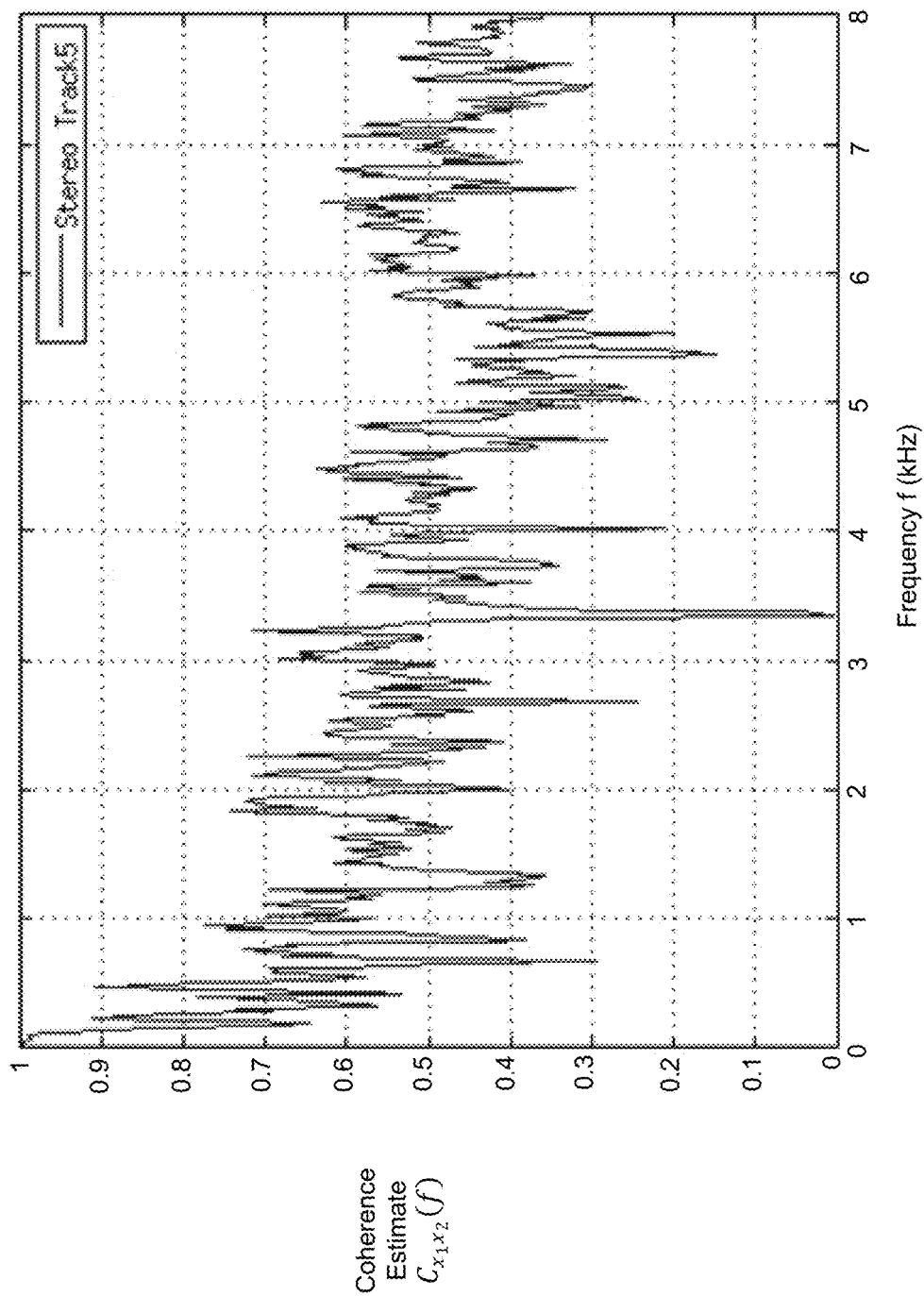
FIG. 3 illustrates a coherence estimate.

Based on a comparison of the degree of coherence and the threshold value, the controller 101 determines (210) whether the channels are sufficiently decorrelated to train the adaptive filters 122. FIG. 3 illustrates a coherence estimate $C_{x_1x_2}(f)$ in a frequency range from approximately 20 Hz to 8 kHz for a sample of each reference signal $x_1(k)$ and $x_2(k)$, exhibiting signal correlation at low frequencies, and strong decorrelation around 3.4 kHz. A function is applied to the coherence estimate $C_{x_1x_2}(f)$. The function may be a statistical metric such as an average of the coherence estimate across a defined frequency range, to determine a coherence value characterizing the correlation between the reference signals. The coherence value is compared to a threshold value to determine whether the signals are sufficiently decorrelated (210). For example, if an average of $C_{x_1x_2}(f) < 0.5$ (f=20 Hz to 20 kHz), the reference signals may be determined to be sufficiently decorrelated (210 "Yes") for adapting the filters $h_{m\_est}(k)$ 122, and if the average of $C_{x_1x_2}(f) \geq 0.5$, the reference signals may be determined to be insufficiently decorrelated (210 "No") for adapting the filters $h_{m\_est}(k)$ 122.

If the reference signals $x_m(k)$ 122 are sufficiently decorrelated (210 "Yes"), then the adaptive filters $h_{m\_est}$ 122 are "trained" (i.e., configured to adapt their filter coefficients) in the conventional manner using the reference signals $x_m(k)$ 122, which are also transmitted to the M speakers 114 in room 104. Otherwise (210 "No"), a decorrelation technique such as the functions in Equations [8] and [9] are applied to the reference signals $x_m(k)$ 122, producing decorrelated reference signals $z_m(k)$ 113. These decorrelated signals are then used to train the adaptive filters $h_{m\_est}$ 122, and are output to the M speakers 114 in room 104. Decorrelation may be applied if and only if the reference signals $x_1, \ldots, x_M$ 112 contain a wide range of frequencies and these signals are not already sufficiently decorrelated. Training the filters $h_{m\_est}$ 122 with decorrelated signals $z_m(k)$ 113 will resolve the channel ambiguity problem, which is to say that the filter coefficients approximating each estimated transfer function $h_{m\_est}(k)$ will converge toward the corresponding (but unknown) actual transfer function $h_m(k)$ 116.

The controller 101 monitors the error signals $e_n(k)$ 140 over time (n=1, 2, ..., N, where N is the number of microphones 118) as the $h_{m\_est}$ filters 122 adapt to determine whether the filters 122 have converged to approximately a stable value. (The connections between the error signals $e_n(k)$ 140 to controller 101 are not illustrated).

Any technique may be used to determine filter convergence, which may be approximated (among other ways) based on absolute values of the error signals reaching stable minima. Upon convergence, the filter coefficients of a filter stabilize to approximately steady state values in the absence of time-varying impulse responses.

An example of a function that may be applied to the error values $e_n(k)$ 140 to determine convergence is a peak detection algorithm. One peak-detection based approach to determining convergence calculates the mean square of the energy of the error signal $e_n(k)$ over a plurality of samples to determine whether a majority of the energy of the error signal $e_n(k)$ is in a narrow window, such as taking 2048 samples, determining a sum of the squares of the first 300 samples, determining a sum of the squares of all 2048 samples, and then comparing a ratio of the two sums with a threshold value to determine whether a majority of the energy is in a narrow window at and around the initial energy peak. In signal processing the energy $E_S$ of a continuous time-domain signal x(t) is defined as:

$$E_S = \langle x(t), x(t) \rangle = \int_{-\infty}^{\infty} |x(t)|^2 dt \quad [12]$$

Another example of a function that may be applied to the error values $e_n(k)$ 140 to determine convergence is to take the mean square of the error signals $e_n(k)$ over a series of samples, divide by the number of samples, and then determine an allowed amount of deviation to determine whether the mean square value indicates a steady-state value. Yet another example of a function that may be applied to the error values $e_n(k)$ 140 to determine convergence is to apply a signal entropy analysis function to the error signals $e_n(k)$, determining that there is filter coefficient stability based on entropy. Another example of a function to determine convergence is to take the mean of the absolute value of $\hat{h}_{old} - \hat{h}_{new}$ and compare the result to a threshold.

As long as there are filters 122 in at least one of the N AECs 102 (where N is the number of microphones 118) that have not yet converged (216 "No"), the controller 101 may continue to monitor (206) coherence of the reference signals 112 and apply decorrelation (214) as needed. Once the filter coefficients in each of the N AECs 102 are estimated to have converged (216 "Yes"), the controller 101 disables (216) decorrelation. If decorrelation had been applied (i.e., 214), this means that the original reference signals $x_1, \ldots, x_M$ 112 are instead provided to the speakers 114 and adaptive filters $h_{m\_est}$ 122. The controller 101 also freezes the filter coefficients of the adaptive filters $h_{m\_est}$ 122. This may be performed by changing the state of the mode signal 111, changing from "False" (logic zero) to "True" (logic one). This change to mode signal 111, which is input into the "hold" input of the adaptive filters 122, causes each of the filters 122 to freeze their filter coefficients. As a consequence, the filters 122 continue to apply the filter coefficients corresponding to the estimated transfer functions $h_{m\_est}$ that had been determined as of the time of convergence (216 "Yes").

In the alternative to monitoring whether the filters $h_{m\_est}$ 122 have converged, the controller 101 may apply decorrelation (214) for a defined duration, such as thirty seconds or a minute, with the duration being longer than would ordinarily be required for the filters $h_{m\_est}$ 122 to converge. As another alternative, instead of monitoring the error signals $e_n(k)$ 140 to determine convergence, an echo return loss enhancement (ERLE) may be determined for each AEC 102, which the controller 101 may use to approximate convergence, such as comparing the ERLE with a threshold value to determine that the filters have converged (216 "Yes") when the ERLE values have each exceeded the threshold.

The controller 101 also puts (222) the secondary adaptive filter $h_{aec}$ 128 into adaptation mode. For example, the changing of the mode signal 111 from "False" (logic zero) to "True" (logic one) is inverted by the inverter 132, releasing the coefficient "hold" on the secondary adaptive filter $h_{aec}$ 128, and changing the state of the bypass switch 134. The secondary adaptive filter $h_{aec}$ 128 outputs an estimated echo signal $y_{aec}(k)$ 130:

$$y_{aec}(k) = h_{aec}(k) * \Sigma y_{est} \quad [13]$$

In this mode, the estimated echo signal $y_{aec}(k)$ 130 is subtracted from the echo signal $y_1(k)$ to obtain the error signal $e_1(k)$ 140*a*:

$$e_1(k)=y_1(k)-y_{aec} \qquad [14]$$

From this point on, the filters $h_{m\_est}$ 122 (m=1, 2, . . . , M) will only be used for filtering the reference signals $x_m(k)$ 112 in order to get $\Sigma y_{est}(k)$ 126. However, the coefficients are locked, such that the estimated transfer functions $h_{m\_est}$ approximated by each filter's filter coefficients correspond to the values as of the time of convergence (216 "Yes").

The secondary adaptive filter $h_{aec}$ 128 remains in adaptation mode, continually applying an adaptive-filter filter coefficient adaptation method. The filter coefficients of the secondary adaptive filter $h_{aec}$ 128 converge in an attempt to minimize a function of the absolute value of the error signal $e_n(k)$ 140*b*. Using LMS, for example, convergence requires a sufficiently small step size, among other things. For as long as the locked filter coefficients of the adaptive filters $h_{m\_est}$ 122 continue to provide an accurate prediction of the actual transfer functions 116, the estimated echo signal $y_{aec}(k)$ 130 output by the secondary adaptive filter $h_{aec}$ 128 may be the same as the signal $\Sigma y_{est}(k)$ 126 that it receives as input (or the secondary filter 128 will rapidly converge until the estimated echo signal $y_{aec}(k)$ 130 corresponds to the signal $\Sigma y_{est}(k)$ 126. However, when a dynamic change in the impulse responses in room 104 occurs and introduces error into the signal $\Sigma y_{est}(k)$ 126, the secondary adaptive filter $h_{aec}$ 128 adapts the estimated echo signal $y_{aec}(k)$ 130 to compensate for the error, so as to minimize a function of the error signal $e_1(k)$. However, it is not possible to perfectly compensate for a dynamic change in this manner for the vast majority of dynamic changes.

The secondary adaptive filter $h_{aec}$ 128 may use any adaptive filter method, such as the least mean squares (LMS) algorithm discussed in connection with Equation [4], or some other stochastic gradient algorithm. The method utilized by the secondary adaptive filter $h_{aec}$ 128 may be the same as those used by the filters $h_{m\_est}$ 122, or may be different. Since the signals input into the secondary adaptive filter $h_{aec}$ 128 are already aggregated, whether the reference signals $x_1, \ldots, x_M$ 112 are or are not decorrelated is not as important to the operation of the secondary adaptive filter $h_{aec}$ 128 as it is to the individual channel filters $h_{m\_est}$ 122. As a result, the improved acoustic echo cancellers 102 provide robust echo cancellation in a dynamic acoustic environment, even if the reference signals $x_m$ 112 are highly correlated.

The controller's selective initial application of decorrelation (214) minimizes unnecessary distortion of the reference signals 112 by allowing distortion to be applied for only a short period of time. This method allows the system 100 to compute each individual channel's filter coefficients in a manageable way, based on the condition of the acoustic environment and the reference signals. The audio output 150 may then be processed by other components, such as inputting the output 150 into a speech processing system to detect and/or recognize an utterance 182 from the person 181 in the receiving room 104.

The controller 101 may determine other metrics characterizing performance of the system periodically over time. For example, the controller 101 may monitor playback signal statistics, the noise environment spectrum, the physical movement of a device containing the speakers 114 and/or the microphones, the statistical deviation of the delta between $\Sigma y_{est}$ 126 and $y_{aec}(k)$ 130 over time, etc. Variations in performance due to noises in the room 104, human speech, etc., tend to be transitory, and are ordinarily unlikely to result in the sort of continual errors that impact such metrics.

Based on comparing one or more of these metrics to one or more threshold values, the controller 101 may periodically reinitiate training of the filters 122 (i.e., changing the state of mode signal 111). Poor metrics over time may indicate that the differences between the actual (unknown) transfer functions $h_m(k)$ 116 in room 104 and the estimated transfer functions corresponding to the filter coefficients of the adaptive filters $h_{m\_est}$ 122 have reached a point where the secondary adaptive filter $h_{aec}$ 128 is no longer able to adequately compensate. Likewise, if the speakers 114 or microphones 118 are determined to have been moved (e.g., due to device movement), then it can be assumed that the estimated transfer functions corresponding to the filter coefficients of the adaptive filters $h_{m\_est}$ 122 are no longer accurate, as the impulse responses within the system will have changed.

Reference signals $x_m(k)$ 112 with a wide spectrum produce the most robust approximation of estimated transfer functions by the adaptive filters $h_{m\_est}$ 122. When the controller 101 has determined that the filter coefficients of the adaptive filters $h_{m\_est}$ 112 should be retrained, the controller 101 may execute a subroutine to monitor the spectrum of the reference signals (206) and determine whether the number of frequencies of a spectrum have a sufficient amount of energy to exceed pre-defined thresholds. If not, the controller 101 may wait until the spectrum does exceed the set of frequency distribution parameters. For example, music is more likely to exhibit a wide frequency distribution than speech, such that the controller 101 may wait for suitable reference signals before reinitiating training of the filters 122.

The controller 101 may apply more than one metric threshold when determining when it should abandon waiting for wide spectrum signals before reinitiating training. For example, if a triggering metric exceeds (or falls below, depending upon the metric) a threshold corresponding to "marginal" echo cancellation, the controller 101 may launch the routine to monitor for wide spectrum reference signals, and wait to reinitiate training until such reference signals are detected. However, if the triggering metric further degrades to exceed (or fall below) another threshold corresponding to "failed" echo cancellation, the controller 101 may abandon waiting for wide-spectrum signals and reinitiate training of the filters 122 using whatever reference signals $x_m(k)$ are received/available (applying decorrelation as discussed in connection with the process in FIG. 2).

As another possible retraining routine, the controller 101 may periodically monitor the spectrum of the reference signals (206) and determine whether the number of frequencies of a spectrum have a sufficient amount of energy to exceed pre-defined thresholds. If they do exceed the distribution parameters, the controller 101 may also determine whether the reference signals are sufficiently decorrelated (210). If they are, the controller 101 may opportunistically reinitiate training of the filters 122, even if not necessitated by the quality metrics. This might occur, for example, if the reference signals are music where there is a low correlation between left and right stereo channels in a two-channel system. This also avoids the potential necessity of decorrelating (214) the signals, which may be noticeable by a listener.

Although the system 100 does not require test tones upon startup to decorrelate the reference signals 112, startup sounds may optionally be used. However, there is no need for any calibration sounds at boot time, or when the room environment changes. This method is dynamically adaptive, without requiring the disruption of an intrusive training period.

To test the performance of the system, two main KPIs (Key Performance Indicators) are ERLE (echo return loss enhancement) and re-convergence time. These two KPIs may be combined into a single measure of "goodness" for AEC, by processing an audio stream (real or computed) with the AEC algorithm under test. For example, testing system performance may include using test audio that includes a variety of audio types (music, speech, mixture of the two), audio source locations (movement of the human talker within the multi-channel stereo field), speaker types (small, large), double talk (a human starts and stops talking in the room), and echo path changes (movement of furniture in a room, opening/closing of a door, movement of people in the room).

Figure 4:
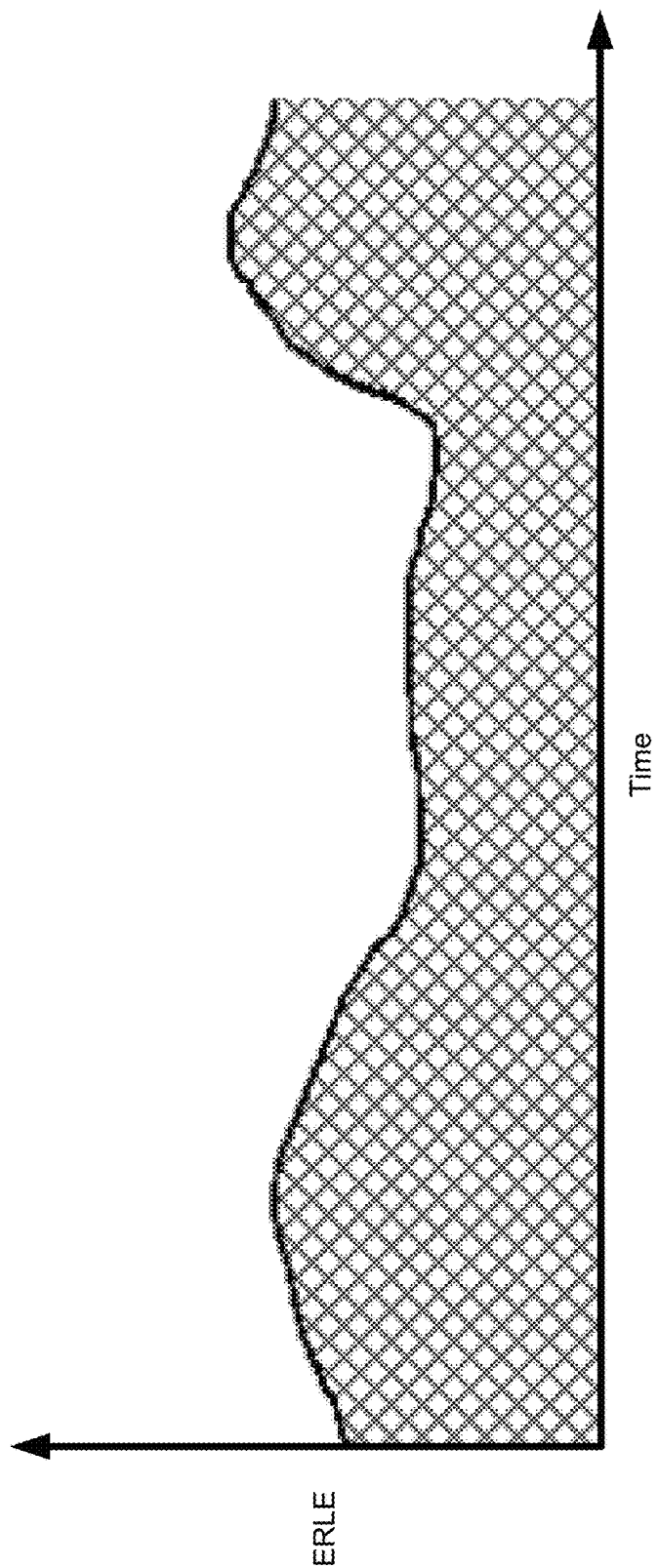
FIG. 4 is a graph illustrating a performance metric for the system in FIG. 1 measured over time.

FIG. 4 is a graph illustrating ERLE as a performance metric for the system in FIG. 1 measured over time. Calculating the area under the ERLE curve for the duration of the test audio stream provides a metric of how the system performs in an environment.

FIG. 5 is a block diagram conceptually illustrating example components of the system 100. In operation, the system 100 may include computer-readable and computer-executable instructions that reside on the device 600, as will be discussed further below.

The system 100 may include audio capture devices, such as an array of N microphones 118, where N>2. The audio capture devices may be integrated into the device 600 or may be separate. The system 100 may also include an audio output device for producing sound, such as speaker(s) 116. The audio output device may be integrated into the device 600 or may be separate.

The device 600 may include an address/data bus 424 for conveying data among components of the device 600. Each component within the device 600 may also be directly connected to other components in addition to (or instead of) being connected to other components across the bus 424.

The device 600 may include one or more controllers/processors 604, that may each include a central processing unit (CPU) for processing data and computer-readable instructions, and a memory 606 for storing data and instructions. The memory 606 may include volatile random access memory (RAM), non-volatile read only memory (ROM), non-volatile magnetoresistive (MRAM) and/or other types of memory. The device 100 may also include a data storage component 608, for storing data and controller/processor-executable instructions (e.g., instructions to perform the process illustrated in FIG. 2, and related operations of the controller 101 such as Fourier transforms). The data storage component 608 may include one or more non-volatile storage types such as magnetic storage, optical storage, solid-state storage, etc. The device 600 may also be connected to removable or external non-volatile memory and/or storage (such as a removable memory card, memory key drive, networked storage, etc.) through the input/output device interfaces 602.

Computer instructions for operating the device 600 and its various components may be executed by the controller(s)/processor(s) 604, using the memory 606 as temporary "working" storage at runtime. The computer instructions may be stored in a non-transitory manner in non-volatile memory 606, storage 608, or an external device. Alternatively, some or all of the executable instructions may be embedded in hardware or firmware in addition to or instead of software.

The device 600 includes input/output device interfaces 602. A variety of components may be connected through the input/output device interfaces 602, such as the speaker(s) 116, the N microphones 118, and a media source such as a digital media player (not illustrated). The input/output device interfaces 602 may also include an interface for an external peripheral device connection such as universal serial bus (USB), FireWire, Thunderbolt or other connection protocol. The input/output device interfaces 602 may also include a connection to one or more networks 699 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 699, the system 100 may be distributed across a networked environment.

The device 600 further includes an AEC module 630 that includes the controller 101, and the individual AEC 102, where there may be an AEC 102 for each microphone 118.

Multiple devices 600 may be employed in a single system 100. In such a multi-device system, each of the devices 600 may include different components for performing different aspects of the AEC process. The multiple devices may include overlapping components. The components of device 600 as illustrated in FIG. 6 are exemplary, and may be included in a stand-alone device or may be included, in whole or in part, as a component of a larger device or system. For example, in certain system configurations, one device may transmit and receive the audio data, another device may perform AEC, and yet another device may use the audio output 150 for operations such as speech recognition.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the AEC module 430 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computing device comprising:
   at least one processor;
   memory including instructions operable to be executed by the at least one processor to perform a set of actions to configure the device to:
   provide a first audio signal as input to a first adaptive filter;
   determine that first filter coefficients of the first adaptive filter have converged to thereby produce a first estimated signal output;
   provide a second audio signal as input to a second adaptive filter;
   determine that second filter coefficients of the second adaptive filter have converged to thereby produce a second estimated signal output;
   disable adapting of the first filter coefficients after the first adaptive filter is determined to have converged;
   disable adapting of the second filter coefficients after the second adaptive filter is determined to have converged;
   provide the sum of the first estimated signal output and the second estimated signal output as input to a third adaptive filter to generate a third estimated signal output;
   cause the third adaptive filter to converge to third filter coefficients; and
   subtract the third estimated signal from a microphone signal to determine an audio output signal.

2. The computing device of claim 1, wherein the instructions further configure the device to:
   determine a first frequency distribution corresponding to the first audio signal;
   determine a second frequency distribution corresponding to the second audio signal;
   determine that the first audio signal and the second audio signal are correlated using the first frequency distribution and second frequency distribution;
   decorrelate the first and second audio signals prior to transmitting the first and second audio signals; and
   end decorrelation of the first and second audio signals after the first and second adaptive filters are determined to have converged.

3. The computing device of claim 1, wherein the instructions further configure the device to:
   determine that the first adaptive filter and the second adaptive filter have converged when a preset duration of time has expired.

4. The computing device of claim 1, wherein the instructions further configure the device to:
   determine a first frequency distribution of the first audio signal;
   determine a second frequency distribution of the second audio signal;
   determine that the first frequency distribution exceeds a threshold distribution parameter;
   determine that the second frequency distribution exceeds the threshold distribution parameter; and cause the first filter coefficients and the second filter coefficients to reconverge.

5. The computing device of claim 1, wherein the instructions further configure the device to:
   determine a first frequency distribution of the first audio signal;
   determine a second frequency distribution of the second audio signal;
   determine that the first frequency distribution exceeds a threshold distribution parameter;
   determine that the second frequency distribution exceeds the threshold distribution parameter;
   determine that the first audio signal and the second audio signal are decorrelated with each other using the first frequency distribution and second frequency distribution;
   configure the first adaptive filter to further adapt the first filter coefficients to reconverge;
   configure the second adaptive filter to further adapt the second filter coefficients to reconverge;
   determine that the first adaptive filter has reconverged;
   determine that the second adaptive filter has reconverged; and
   disable adapting of the first and second filter coefficients after the first and second adaptive filters are determined to have reconverged.

6. The computing device of claim 1, wherein the first, second, and third adaptive filters apply a least mean squares (LMS) or a stochastic gradient algorithm to adapt their respective filter coefficients.

7. The computing device of claim 1, wherein the instructions further configure the device to:
   receive the first audio signal;
   receive the second audio signal;
   transmit a first audio signal to a first sound reproduction device;
   transmit the second audio signal to a second sound reproduction device;
   receive, from a microphone, a detected signal including a representation of a first portion of the first audio signal and a representation of a second portion of the second audio signal;
   determine a sum of the first estimated signal output and the second estimated signal output;
   subtract the sum from the detected signal to determine an output signal; and
   adapt first filter coefficients of the first adaptive filter and second filter coefficients of the second adaptive filter to converge.

8. The computing device of claim 7, wherein the instructions further configure the device to:
   determine a stability of a function of the output signal; and
   determine that the first adaptive filter and the second adaptive filter have converged based on the stability of the function of the output signal.

9. The computing device of claim 1, wherein the instructions further configure the device to:
   determine a quality metric characterizing the audio output signal;
   determine that the quality metric does not satisfy a quality threshold value;
   configure the first adaptive filter to further adapt the first filter coefficients and the second filter coefficients to reconverge;

determine that the first adaptive filter and the second adaptive filter have reconverged; and disable adapting of the first and second filter coefficients after the first and second adaptive filters are determined to have reconverged.

10. The computing device of claim 9, wherein the quality metric is based on one or more of an echo return loss enhancement (ERLE) for the audio output signal or an amount of time it takes the third adaptive filter to reconverge the function of the audio output signal after convergence is lost.

11. A method to be performed by a device, the method comprising:
providing a first audio signal as input to a first adaptive filter;
determining that first filter coefficients of the first adaptive filter have converged to thereby produce a first estimated signal output;
providing a second audio signal as input to a second adaptive filter;
determining that second filter coefficients of the second adaptive filter have converged, given a second audio signal as input, to thereby produce a second estimated signal output;
disabling adapting of the first filter coefficients after the adaptive filters is determined to have converged;
disabling adapting of the second filter coefficients after the second adaptive filter is determined to have converged;
providing a sum of the first estimated signal output and the second estimated signal output as input to a third adaptive filter to generate a third estimated signal output;
causing the third adaptive filter to converge to third filter coefficients; and
subtracting the third estimated signal from a microphone signal to determine an audio output signal.

12. The method of claim 11, further comprising:
determining a first frequency distribution corresponding to the first audio signal;
determining a second frequency distribution corresponding to the second audio signal;
determining that the first audio signal and the second audio signal are correlated using the first frequency distribution and second frequency distribution;
decorrelating the first and second audio signals prior to transmitting the first and second audio signals to first and second sound reproduction devices prior to providing the first and second audio signals as input to the first and second adaptive filters; and
ending decorrelation of the first and second audio signals after the first and second adaptive filters are determined to have converged.

13. The method of claim 11, further comprising:
determining that the first adaptive filter and the second adaptive filter have converged when a preset duration of time has expired.

14. The method of claim 11, further comprising:
determining a first frequency distribution of the first audio signal;
determining a second frequency distribution of the second audio signal;
determining that the first frequency distribution exceeds a threshold distribution parameter;
determining that the second frequency distribution exceeds the threshold distribution parameter; and cause the first filter coefficients and the second filter coefficients to reconverge.

15. The method of claim 11, further comprising:
determining a first frequency distribution of the first audio signal;
determining a second frequency distribution of the second audio signal;
determining that the first frequency distribution exceeds a threshold distribution parameter;
determining that the second frequency distribution exceeds the threshold distribution parameter;
determining that the first audio signal and the second audio signal are decorrelated with each other using the first frequency distribution and second frequency distribution;
configuring the first adaptive filter to further adapt the first filter coefficients to reconverge;
configuring the second adaptive filter to further adapt the second filter coefficients to reconverge;
determining that the first adaptive filter has reconverged;
determine that the second adaptive filter has reconverged; and
disabling the adapting of the first and second filter coefficients after the first and second adaptive filters are determined to have reconverged.

16. The method of claim 11, wherein the first, second, and third adaptive filters apply a least mean squares (LMS) or a stochastic gradient algorithm to adapt their respective filter coefficients.

17. The method of claim 11, further comprising:
receiving the first audio signal;
receiving the second audio signal;
transmitting the first audio signal to a first sound reproduction device;
transmitting the second audio signal to a second sound reproduction device;
receiving, from a microphone, a detected signal including representation of a first portion of the first audio signal and a representation of a second portion of the second audio signal;
determining a sum of the first estimated signal output and the second estimated signal output;
subtracting the sum from the detected signal to determine an output signal; and
adapting first filter coefficients of the first adaptive filter and second filter coefficients of the second adaptive filter to converge.

18. The method of claim 17, further comprising:
determining a stability of a function of the output signal; and
determining that the first adaptive filter and the second adaptive filter have converged based on the stability of the function of the first output signal.

19. The method of claim 11, further comprising:
determining a quality metric characterizing the audio output signal;
determining that the quality metric does not satisfy a quality threshold value;
configuring the first adaptive filter to further adapt the first filter coefficients and the second filter coefficients to reconverge;
determining that the first adaptive filter and the second adaptive filter have reconverged; and
disabling the adapting of the first and second filter coefficients after the first and second adaptive filters are determined to have reconverged.

20. The method of claim 19, wherein the quality metric is based on an echo return loss enhancement (ERLE) for the audio output signal or an amount of time it takes the third adaptive filter to reconverge the function of the audio output signal after convergence is lost.

\* \* \* \* \*